US009026666B2

(12) United States Patent
Krishnakumar et al.

(10) Patent No.: US 9,026,666 B2
(45) Date of Patent: May 5, 2015

(54) COMMUNICATION SESSION CLONING USING BARCODES

(71) Applicant: Avaya Inc., Basking Ridge, NJ (US)

(72) Inventors: Anjur S. Krishnakumar, Princeton, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 289 days.

(21) Appl. No.: 13/718,050

(22) Filed: Dec. 18, 2012

(65) Prior Publication Data

US 2013/0212286 A1 Aug. 15, 2013

Related U.S. Application Data

(63) Continuation-in-part of application No. 13/396,583, filed on Feb. 14, 2012.

(51) Int. Cl.
*H04L 29/08* (2006.01)
*H04L 29/06* (2006.01)

(52) U.S. Cl.
CPC .... *H04L 29/08639* (2013.01); *H04L 29/06326* (2013.01); *H04L 29/06319* (2013.01); *H04L 67/148* (2013.01)

(58) Field of Classification Search
CPC .................. H04L 29/06319; H04L 29/06326; H04L 29/08639; H04L 67/148
USPC ..................... 709/227, 228, 229, 217; 725/87; 713/150; 715/753, 234; 726/7; 370/232, 254; 463/25
See application file for complete search history.

(56) References Cited

U.S. PATENT DOCUMENTS

| 2002/0073210 | A1  | 6/2002  | Low et al.      |          |
|--------------|-----|---------|-----------------|----------|
| 2003/0229900 | A1* | 12/2003 | Reisman         | 725/87   |
| 2004/0210657 | A1  | 10/2004 | Narayanan et al.|          |
| 2006/0291455 | A1  | 12/2006 | Katz et al.     |          |
| 2007/0286101 | A1  | 12/2007 | Gagne et al.    |          |
| 2008/0034057 | A1* | 2/2008  | Kumar et al.    | 709/217  |
| 2009/0075642 | A1  | 3/2009  | Rantapuska et al.|         |
| 2009/0325561 | A1  | 12/2009 | Xu et al.       |          |
| 2011/0107379 | A1* | 5/2011  | Lajoie et al.   | 725/87   |
| 2011/0225417 | A1* | 9/2011  | Maharajh et al. | 713/150  |
| 2011/0239133 | A1* | 9/2011  | Duffus et al.   | 715/753  |

(Continued)

OTHER PUBLICATIONS

Non-Office Action Received for U.S. Appl. No. 13/396,583, mailed Jan. 9, 2014 (10 pages).

(Continued)

*Primary Examiner* — Le H Luu
(74) *Attorney, Agent, or Firm* — Maldjian Law Group LLC; John Maldjian; Alexander D. Walter

(57) ABSTRACT

Method to clone a communication session from a first device to a second device, including: receiving a request to identify the communication session; rendering an information message comprising an identification of the communication session, wherein the information message is configured to be transmitted from the first device; acquiring the information message from the second device to clone the communication session onto the second device; bridging the second device to the communication session without dropping the first device from the communication session, to produce a cloned communication session; and sending a confirmation message, wherein no prior association between the first device and the second device is used during the cloning.

14 Claims, 6 Drawing Sheets

(56) References Cited

U.S. PATENT DOCUMENTS

| | | |
|---|---|---|
| 2012/0198531 A1* | 8/2012 | Ort et al. .......................... 726/7 |
| 2012/0224483 A1* | 9/2012 | Babiarz et al. ................ 370/232 |
| 2013/0090169 A1 | 4/2013 | Liu et al. |
| 2013/0165210 A1* | 6/2013 | Nelson et al. ................... 463/25 |
| 2013/0212289 A1 | 8/2013 | Krishnakumar et al. |
| 2014/0053054 A1* | 2/2014 | Shen et al. ................... 715/234 |
| 2014/0321328 A1* | 10/2014 | Zuniga et al. ................. 370/254 |

OTHER PUBLICATIONS

US Final Office Action mailed Aug. 13, 2014, issued in connection with corresponding U.S. Appl. No. 13/396,583.

US Non-Final Office Action mailed Jan. 16, 2015, issued in connection with corresponding U.S. Appl. No. 13/396,583.

* cited by examiner

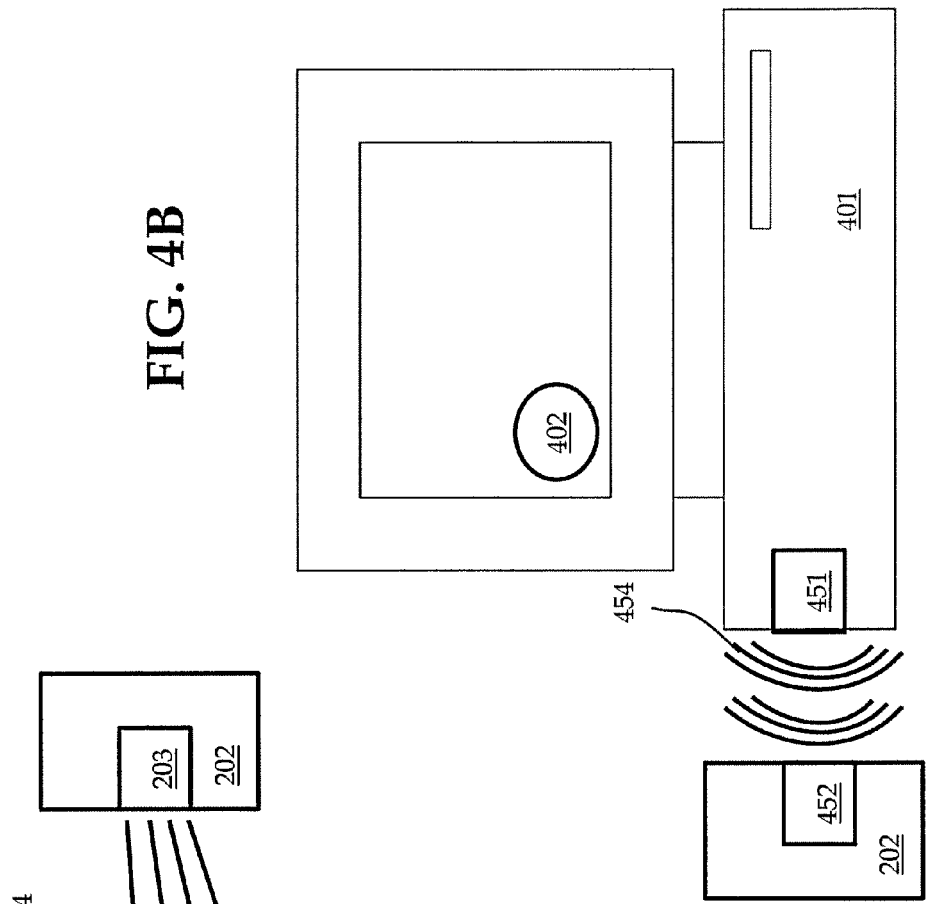
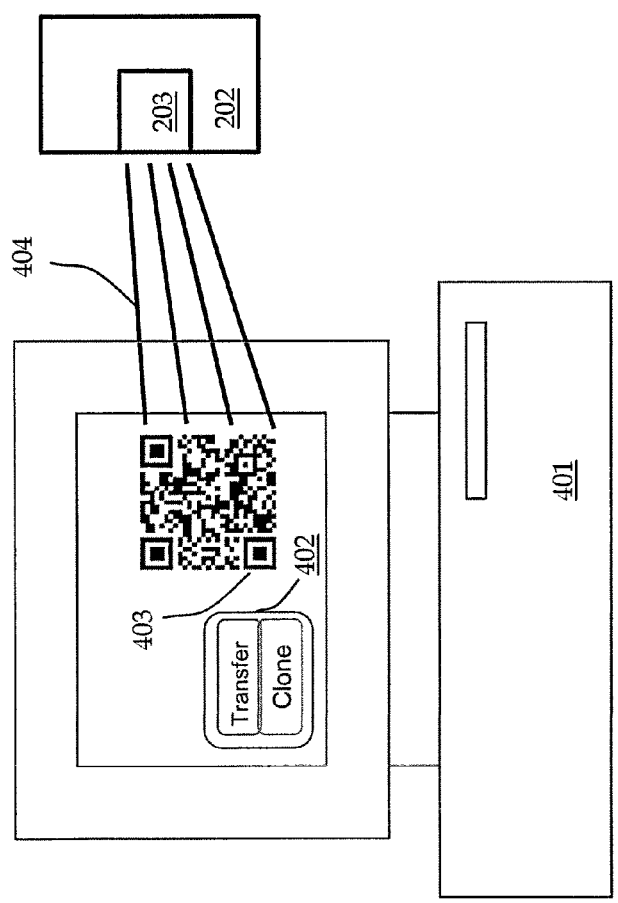
FIG. 4B
FIG. 4A

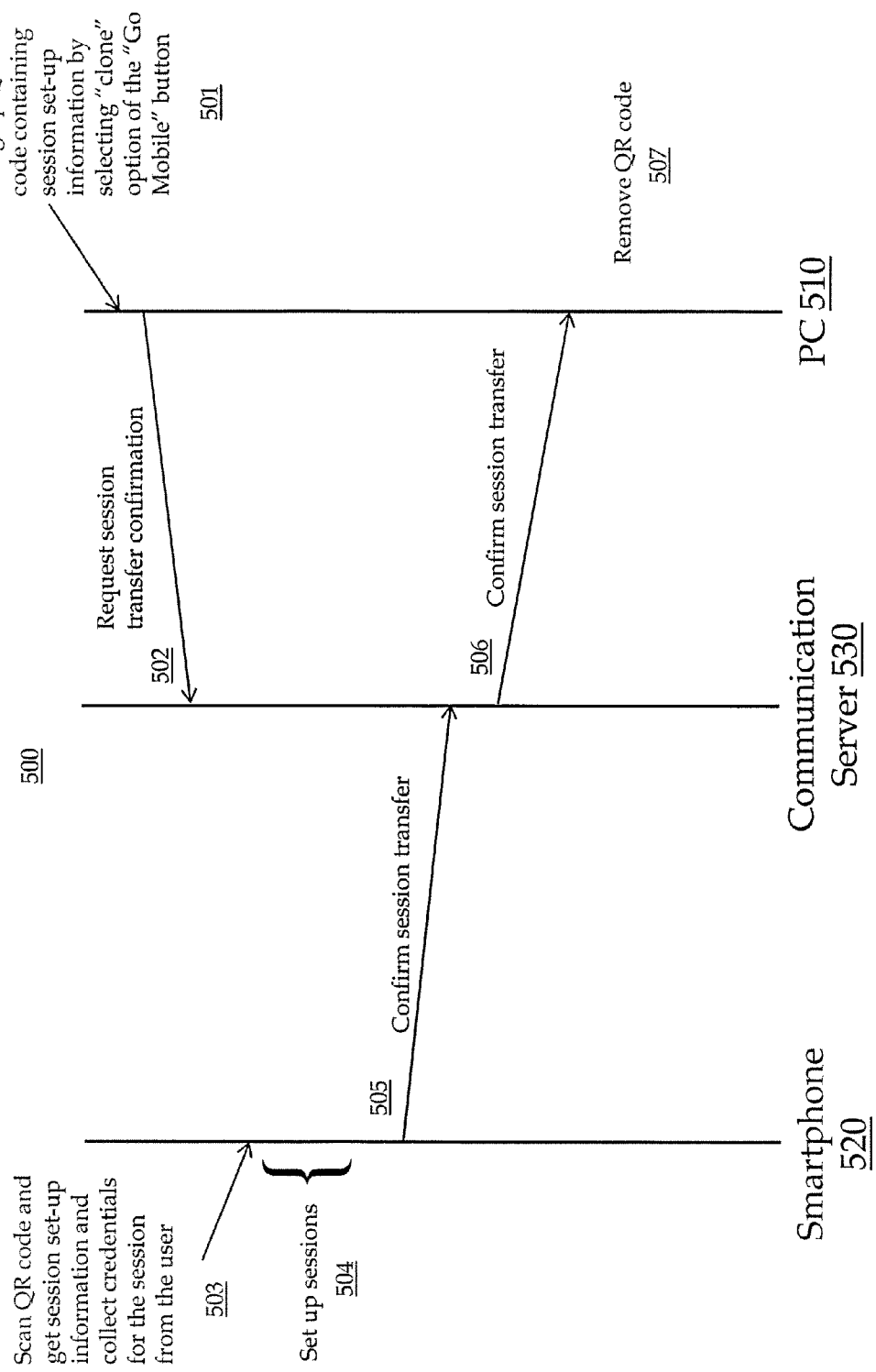

COMMUNICATION SESSION CLONING USING BARCODES

CROSS-REFERENCE TO RELATED APPLICATIONS

This application is a continuation in part of U.S. patent application Ser. No. 13/396,583 filed on Feb. 14, 2012, the entire content of which is hereby incorporated by reference in its entirety.

BACKGROUND

1. Field of the Invention

Embodiments in accordance with the present invention pertain to convergence of fixed and mobile communication platforms and, in particular, the transfer of multimedia communication sessions including, e.g., audio, video, web, text (hereinafter referred to as "communication sessions"), from a PC or laptop to a smart-phone, tablet PC, and the like, and vice versa.

2. Description of the Related Art

A business person who desires to participate in, for example, a communication session (e.g., a conference, a conferencing session, a communication session, or a service agent call in a call center) but who needs to move to a different location or change the agent servicing the communication session generally has at least three options.

First, the business person can drop the communication session at a first location, travel to a second location, and re-establish the communication session at the second location. Disadvantages of this approach include that the business person will be disconnected from the web conferencing session during transit, unable to participate and lose communication content during this period of mobility, and will have to re-enter their credentials in order to join the communication session at the second location.

Second, at least a portion of a communication session can be transferred to a mobile device depending on the capability of the mobile device and the level of service available at least to the mobile device. For instance, the audio communication may be transferred but not the web communication. The full communication session can be reestablished when the business person reaches the second location. This second option suffers from having a need to re-enter their credentials in order to join the communication session at the second location.

Third, a product such as the Avaya EC500 can be used, which allows call docking and pick up between desk phones and mobile devices. However, this proposed solution requires prior provisioning of the EC500 service.

Disadvantages of the known art as described above includes that session transfers need to be done manually, and that initiating the session transfer often involves user knowledge of information such as telephone numbers, participant codes, web conferencing URL and/or session transfer URL, and so forth. In the known art, this knowledge is entered manually.

Therefore, a need exists to provide convergence of fixed and mobile communication platforms and, in particular, the transfer of communication sessions—web and audio—from a pc or laptop to a mobile device like a tablet PC, smart-phone, and the like, and vice versa, in order to move from at least a first location to a second location.

SUMMARY

Embodiments in accordance with the present invention target fixed-mobile convergence, i.e., a continuation and/or merging of a communication session between a relatively fixed-location communication terminal (e.g., a personal computer or other desktop platform) and a mobile device (e.g., a smart-phone, tablet PC, or the like). The continuation and/or merging may comprise adding a mobile device to a communication session hosted on a desktop platform, transferring/cloning the communication session from a desktop platform to the mobile device, transferring the communication session from the mobile device to the desktop platform, and/or adding the desktop platform to the communication session. The communication session may comprise both video (web-based video, webcam, etc.) and audio.

Optionally, the system may further include a memory coupled to the processor, the memory configured to store instructions such that, when the instructions are performed by the processor, the processor performs the steps of: receiving via a first communication channel an information message comprising an identification of the communication session; sending via a second communication channel a join request; joining the communication session; and sending via the second communication channel a confirmation message confirming the transfer of the communication session.

Optionally, the system may include a memory coupled to the processor, the memory configured to store instructions such that, when the instructions are performed by the processor, the processor performs the steps of: receiving via a first communication channel an information message comprising an identification of the nonparticipating conference-enabled computer; sending via a second communication channel a request to push the communication session to the nonparticipating conference-enabled computer; and receiving a confirmation that the communication session has been pushed to the nonparticipating conference-enabled computer.

Embodiments in accordance with the present invention may provide a method for transferring a communication session to a mobile device, including: receiving via a first communication channel an information message comprising an identification of the communication session; sending via a second communication channel a join request; joining the communication session; and sending via the second communication channel a confirmation message confirming the transfer of the communication session.

Embodiments in accordance with the present invention may provide a method for transferring a visual communication session from a mobile device to a nonparticipating conference-enabled computer, including: receiving via a first communication channel an information message comprising an identification of the nonparticipating conference-enabled computer; sending via a second communication channel a request to push the communication session to the nonparticipating conference-enabled computer; and receiving a confirmation that the communication session has been pushed to the nonparticipating conference-enabled computer.

Embodiments in accordance with the present invention may provide a system to change a set of participating members of a communication session, including: a first communication-enabled member comprising: a communication transceiver configured to convey the communication session; and an interface to a short-range communication link; a second communication-enabled member comprising: a communication transceiver enabled to convey the communication session; and an interface to the short-range communication link configured to communicate with the interface to the short-range communication link of the first communication-enabled member; and a communication server configured: to transfer the communication session from the first communication-enabled member to the second communication-enabled member in response to a first formatted message from the second communication-enabled member; and to transfer the communication session from the second communication-enabled member to the first communication-enabled member in response to a second formatted message from the second communication-enabled member, wherein the communication session is conveyed by a communication channel different from the short-range communication link.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments encompassed within the scope of the present invention, and, therefore, are not to be considered limiting, for the present invention may admit to other equally effective embodiments, wherein:

FIG. 4A illustrates docking a communication session from a mobile device to a PC in accordance with an embodiment of the present invention;

FIG. 4B illustrates docking a communication session from a mobile device to a PC in accordance with an embodiment of the present invention;

FIG. 5 illustrates a method and messages associated with cloning a communication session from a PC to a mobile device, in accordance with an embodiment of the present invention.

Figure 1:
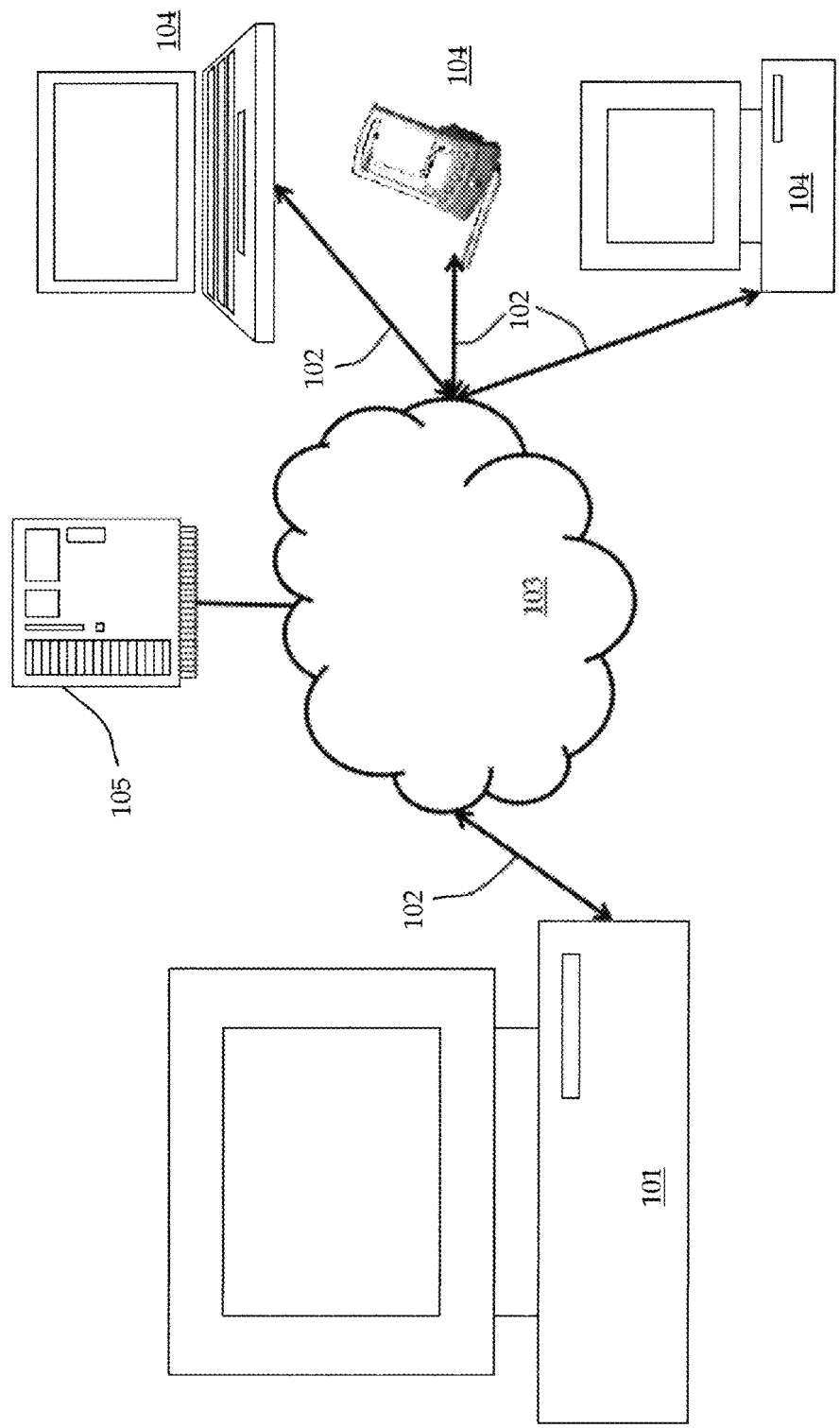
FIG. 1 illustrates a configuration for a web conference in accordance with an embodiment of the invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines.

DETAILED DESCRIPTION

As used herein, the term "cloning" refers generally to a process that occurs when a communication session is transferred from a first communication terminal to a second communication terminal, without termination of the communication session on the first communication terminal.

As used herein, the terms "transfer" and "transferring" refer generally (unless clearly indicated otherwise by the surrounding context of usage) to a process that occurs when a communication session is transferred from a first communication terminal to a second communication terminal, without consideration as to whether or not the communication session is then terminated on the first communication terminal.

Embodiments in accordance with the present invention target fixed-mobile convergence, i.e., a continuation and/or merging of a communication session between a relatively fixed-place communication terminal (e.g., a personal computer, a mobile computer used as a desktop replacement, or other desktop platform, etc.) and a mobile device (e.g., a smart-phone, tablet PC, or the like). For ease of reference, the fixed-place communication terminal may be referred to herein as a desktop PC or desktop platform. The continuation and/or merging may include adding a mobile device to a communication session hosted on a desktop platform via the cloning process, and adding the desktop platform to the communication session via the cloning process. The communication session may include both video (web-based or webcam, etc.) and audio, separately or together as an audiovisual session.

Devices operating by use of Bluetooth technology can see each other when they are within radio range, but they cannot communicate with each other unless they have been explicitly paired. Bluetooth pairing is one example of a prior association. Prior association between devices implies that the devices know each other's identities beforehand and the association between their identities may have been pre-provisioned locally at the two devices or at a server. The Avaya™ Extension to Cellular (EC500) system is another known example of a system using prior association.

Embodiments in accordance with the present invention are usable in a contact center in order to facilitate easier transfer of a customer communication session from one contact center agent to another contact center agent, without any prior association knowledge of the devices used by the contact center agents. If any such prior association knowledge exists between the devices, the prior association knowledge is not used by the embodiments during the transfer. In such a scenario, a contact center agent uses a communication endpoint such as a PC to communicate with a customer.

In known methods, the contact center agent has pre-registered their audio/video/chat/web endpoints with a contact center system. At some later time the agent may want to transfer a communication session to another agent, for example if different expertise is needed or if it is time for a shift change. The first agent will look up the second agent, and then request that a system in accordance with an embodiment of the known methods to transfer the session to the second agent. The system will look up the second agent's registered endpoints (PC, phone, IM client etc.) and transfer the session to those endpoints. In the known methods, the system cannot handle devices used by the second agent that are not pre-registered with the system. In contrast, embodiments in accordance with the present invention are able to transfer the communication session without a need to pre-register the communication endpoints.

Embodiments in accordance with the present invention are able to transfer a communication session without a need for a prior association between the desktop platform and the mobile device, in contrast to systems using Bluetooth technology. Embodiments in accordance with the present invention may be useful when: (a) transferring an ongoing conference session from a desktop platform to a mobile device (e.g., smart-phone, tablet PC) as a user goes mobile; (b) docking a saved or active communication session from a mobile device to a desktop platform; and/or (c) transferring an ongoing communication session from one mobile device to another mobile device (e.g., transferring from one customer service agent to another customer service agent). A "saved session" refers to a session for which all the information needed to instantiate a conference session at a later time has been stored in a memory. The information to save is obtained from a participating terminal (e.g., the desktop platform or the mobile device) and can be recalled from memory for use at a later time. The saved session may contain web and audio conferencing credentials, user identities, URLs, and so forth. Embodiments in accordance with the present invention help facilitate continuity of the active communication session.

Embodiments in accordance with the present invention may use a short-range communication method and channel to transfer sufficient information about a communication session in order for the communication session to be set up or modified. The setup or modification may provide a different set of participants, such as by adding a mobile and/or fixed terminal to the communication session, or dropping a mobile and/or fixed terminal from the communication session. Short-range communication methods and channels may include an optical recognition channel, an infrared transmitter/receiver, or a short-range wireless channel such as a Bluetooth, Zig-Bee, or WiFi communications link.

A line-of-sight optical channel may be formed by a display of an information-bearing display (i.e., an information-bearing message), such as a 1-D barcode, 2-D barcode, QR code, matrix barcode, Data Matrix code, or the like, on a first device, which is visible to an image capture capability provided by a second device. A QR code, for instance, is a known type of matrix barcode (i.e., a two-dimensional "2-D" barcode). QR codes have a large storage capacity relative to the data requirements needed to set up a communication session. The QR code includes dark modules arranged in a square pattern on a lighter background. The information-bearing display will be referred to herein generically as a QR code unless the context makes clear that a different meaning is intended. The information encoded can be made up of essentially any kind of digital data.

The information-bearing display may be rendered at the first device or at a communication server. Rendering, as used herein with respect to a line of sight optical channel, may refer to the calculation of an image, for instance by the creation of a graphics file (e.g., JPG, TIF, GIF, etc.) or equivalent set of commands. Displaying, as used herein, is the physical and/or optical production of the rendered image. The information-bearing display may be rendered at the first device by an application resident thereon, based upon communication session information known or knowable by the first device. Alternatively, the information-bearing display may be rendered at the communication server and transmitted to the first device for display on the first device.

The information-bearing display is optically conveyed from the source of the display to a camera or other image capture apparatus by photons, as known by a person of skill in the art. However, unlike a modulated optical signal employing digital or analog modulation, the optical signal received by the camera or other image capture apparatus is an unmodulated and visually recognizable representation of the image itself and not a modulated representation of the image.

The data encoded in the QR code or the like may include data related to conference setup information. For example, the information encoded in the information-bearing display may include: a uniform resource locator ("URL") of a session transfer server; a conference and/or session ID number and a security code; type of transfer (e.g., a transfer or a cloning); and/or an identification such as an IP address of the first device. Embodiments in accordance with the present invention may not need the identification of the first device if the communication session does not need to be torn down at the first device after the communication session has been transferred to the mobile device (i.e., when cloning). The information-bearing display may also include additional information exchanged among conference participants up to that point of the conference, such as virtual card ("Vcard") information, chat history information, or documents referenced during the session or URL links to such documents. The information-bearing display may also include a URL link to the web communication server such that additional information can be downloaded by the mobile device from the conference server, at the URL link provided. The session transfer server and the web communication server may be physically separate servers, or may be logical partitions of a single physical server.

FIG. 1 illustrates a configuration for a web conference in accordance with an embodiment of the invention. A user's desktop PC 101 may have executing thereon a client computer program or web application ("app") (e.g., a Java program) that provides a web communication capability to a user (i.e., to a person). The client computer program or web app will be referred to herein generically as a client computer program. The client computer program is in communication contact with one or more other computer clients 104 executing client computer programs, by way of a communication link 102 (e.g., Ethernet, WiFi, Bluetooth, etc.) to a communication network 103 (e.g., Internet or an intranet). Computer clients 104 may include a desktop PC, laptop PC, and/or a mobile device (e.g., another conference participant who has or is transferring a conference by use of embodiments in accordance with the present invention). The communication network 103 may be coupled to a server 105 executing a server computer program that implements web-communication server functions for the web communication capability. Alternatively, one or more desktop PCs 101 may be communicatively connected in a peer-to-peer configuration to implement a web communication capability rather than by use of a client-server configuration.

PC 101 may include a processor, a memory coupled to the processor, a receiver, transmitter, and/or transceiver coupled to the processor, and/or one or more user input/output (I/O) devices (e.g., display screen, keyboard, mouse, etc.). The memory stores data and/or program instructions used by the processor. The memory may include permanent, non-volatile memory (e.g., ROM), or volatile memory (e.g., RAM), or rewritable memory (e.g., hard drive or flash memory), or any combination thereof. The program instructions, when executed by the processor, carry out the processes performed by PC 101.

Figure 2:
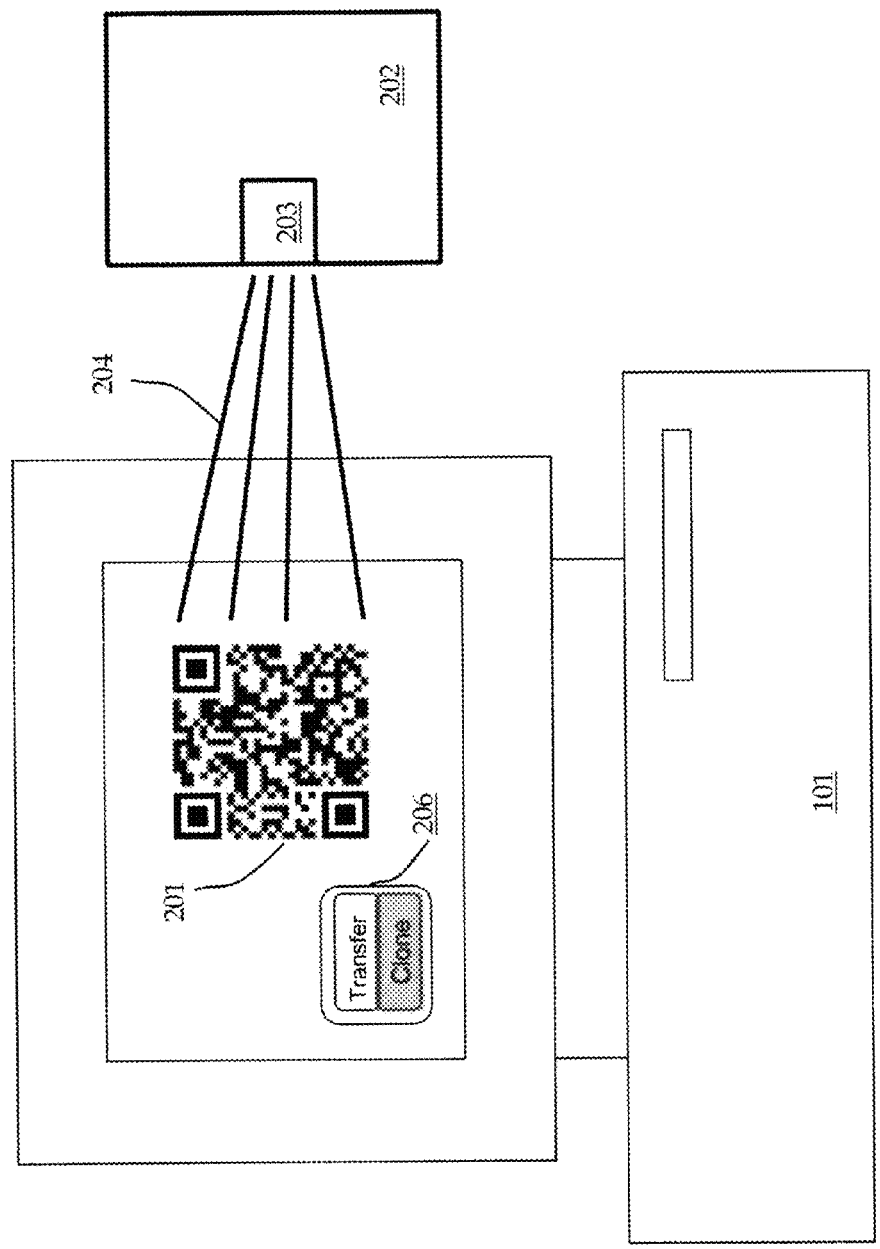
FIG. 2 illustrates a desktop to mobile transfer in accordance with an embodiment of the present invention.

FIG. 2 illustrates a desktop to mobile transfer in accordance with an embodiment of the present invention. The client computer program running on desktop PC 101 may provide a command input 206 such as a link, hotspot, command, menu choice, popup, hot key, or the like in order to allow a user to start a transfer process. Upon a command from a user to start the transfer process, the client computer program will gather information that identifies the web communication session. The information may be gathered from memory storage, for instance memory storage that is local to the desktop PC 101. The information is then encoded in an information-bearing display 201 such as a QR code. However other types of information-bearing displays 201 may be used, such as a 1-D barcode, 2-D barcode, matrix barcode, Data Matrix code, or the like.

The user may then manipulate their mobile device 202, in particular a camera 203 associated with mobile device 202, to take a picture or scan of the information-bearing display 201, or to allow the mobile device 202 to recognize the presence of the information-bearing display 201 by way of a line-of-sight optical channel 204 when display 201 is in the field of view of the camera 203. Mobile device 202 may have installed thereon an application program (i.e., an "app") that assists in the transfer of a communication session to and from the mobile device 202. Recognition software, which is part of the application program resident in mobile device 202, may recognize information in the information-bearing display 201, and convert the information into a digital format that can be more easily and/or more compactly transmitted over a communication channel in order to establish the communication session on the smartphone, as explained below in further detail.

If the smartphone cannot accommodate the bandwidth needed by the conference, the communication session server has an ability to customize the content to the end-device. For example, when a mobile device connects to the communication server, the communication server detects the type of device that is connecting, and then serves a "mobile" version of the web page to the end-device. The mobile version of the web page may be less bandwidth consuming than a regular version of the web page. Depending on its capabilities, the mobile device may not establish some portions of the session, e.g., video in a conference call. The impact to other participants is not dependent on the device, but rather how the conferencing server handles the downgrade. Some embodiments set up the server such that none of the other participants will see any effect other than the obvious one of user not being a part of the modality (e.g., streaming video) that his or her mobile device does not support. The session that was saved when going mobile will have all the information (across all modalities) associated with the conference. Hence the conference will upgrade back to normal when migrating to the PC or any other similar device.

Figure 3:
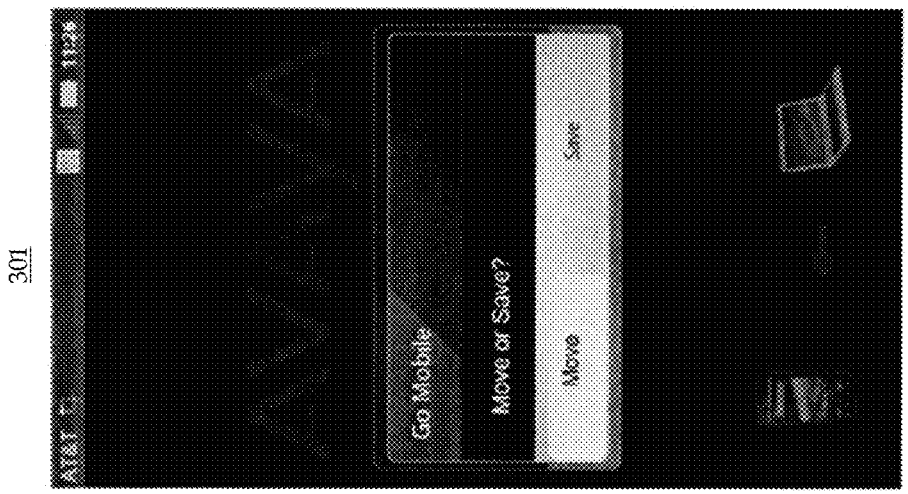
FIG. 3 illustrates a user interface for a mobile device, in accordance with an embodiment of the present invention.

FIG. 3 illustrates a user interface for a mobile device, in accordance with an embodiment of the present invention. The application program presents user interface 301 for assisting the transfer of a communication session to and from the mobile device 202. User interface 301 may include one or more portions that indicate a status (e.g., a current or anticipated configuration, progress status of the transfer, etc.) or to provide user input such as command to initiate an action or a confirmation of a command. "Transfer," as referred to in FIG. 3, will initiate a transfer of the session from PC 101 to mobile device 202. "Save," as referred to in FIG. 3, will save the session information at mobile device 202 for future use, such as for starting the conference on mobile device 202 at a later time or for carrying the information in order to dock to a PC 101 at a later time. The session information is also saved during the Transfer/Clone process. The process initiated in the user interface of FIG. 3 occurs on mobile device 202. In this process, PC 101 just displays QR code 201. The direction of transfer as shown in FIG. 3 is from PC 101 to mobile device 202.

FIG. 4A illustrates docking a communication session from a mobile device to a PC in accordance with an embodiment of the present invention, and FIG. 4B illustrates docking a communication session from a mobile device to a PC in accordance with another embodiment of the present invention. Mobile device 202 bearing a communication session is being docked to an uninvolved PC 401. PC 401 has executing thereon a client computer program that enables a web communication capability to a user (i.e., a person), but PC 401 is not presently participating (i.e., a non-participant) in the communication session maintained by mobile device 202. PC 401 may provide a command input 402 such as a link, hotspot, command, menu choice, popup, hot key, or the like in order to allow a user to start a transfer process from mobile device 202 to PC 401.

Upon a command from a user to start the transfer process, the client computer program executing on PC 401 will gather information that identifies the credentials of PC 401 so that PC 401 can be joined (i.e., bridged) to the communication session. The information may be gathered from memory storage, for instance memory storage that is local to the desktop PC 401. Referring to FIG. 4A, the information may then encoded in an information-bearing display 403 such as a QR code 403. However other types of information-bearing displays 403 may be used, such as a 1-D barcode, 2-D barcode, Data Matrix code, or the like. Information-bearing display 403 is transmitted to mobile device 202, and in particular to an image sensor 203 within mobile device 202, by way of a line-of-sight optical channel 404. Operation of image sensor 203 and/or mobile device 202 with respect to detecting and processing information-bearing display 403 proceeds similarly as with the embodiment of FIG. 2.

FIG. 4B illustrates an alternative embodiment in which the information may be encoded and transferred in a non-visual information transfer medium 454 such as a near field communication ("NFC") or other RF signal. For example, an RF coupling may be implemented between an RF transmitter 451 operated by PC 401 and an RF receiver 452 operated by mobile device 202. The RF coupling may also be active in the opposite direction, i.e., from a transmitter (not illustrated in FIG. 4B) in mobile device 202 to a receiver (not illustrated in FIG. 4B) in PC 401, for information transfer from mobile device 202 to PC 401.

As with when the communication session was transferred to mobile device 202, other information transfer channels (not illustrated in FIGS. 4A-4B) may be used to transfer credentials of PC 401 to mobile device 202, such as: a relatively short-range wireless communication link such as the NFC communication link described above in connection with FIG. 4B.

FIG. 5 illustrates a method 500 and messages associated with cloning a communication session from a desktop PC 510 to a smartphone 520, through use of communication server 530, in accordance with an embodiment of the present invention. Message transfers for session setup, maintenance, and tear down may be conducted according to a protocol that provides audio-visual communication sessions on a packet network. In particular, a suitable protocol should address call signaling and control, multimedia transport and control, and bandwidth control for point-to-point and multi-point conferences. Examples of suitable protocols include the Session Initiation Protocol ("SIP"), and ITU H.323 call signaling. H.323 is based on the ITU-T Recommendation Q.931 protocol and is suited for transmitting calls across networks using a mixture of IP, PSTN, ISDN, and QSIG over ISDN.

Method 500 begins when a user participating in a communication session from a desktop PC 510 wishes to transfer the session to a smartphone 520. The user at step 501 will then command the desktop PC 510 to initiate the transfer, for instance by activating either the "Transfer" or "Clone" option of a "Go Mobile" command (i.e., a link, hotkey, etc.) in order to create and display a QR code or other visual transfer medium containing session set-up information. Step 501 may include an indication from the user as to whether the communication session is to be transferred or cloned. If the communication session is cloned, then the communication session will remain active on PC 510 at the completion of method 500.

PC 510 provides a session ID to identify the session being transferred, so that PC 510 can be notified when the session has been setup at the mobile end. This session ID is communicated in the QR code displayed to smartphone 520. Substantially at the same time, PC 510 may send message 502 to communication server 530 in order to request a session transfer confirmation.

A visual/audio indicator may be provided to notify participants of the conference that a user is going mobile or has docked. Such an indicator may be controllable if the user would prefer not to alert the other participants of their change in connectivity, e.g., for security or accountability purposes. For example, when changing connectivity there may be a change in an icon display or an audio indication, i.e., a beep, or a change to an icon type associated with the user's presence in the web-conferencing display.

At step 503, a user may manipulate smartphone 520 (or other sufficiently enabled mobile device) in order to take a picture, scan, or otherwise recognize the QR code displayed on PC 510. A sufficiently enabled mobile device is one which has a camera and also has an ability to execute an application program such as a QR-recognition app. The QR code contains sufficient information in order to enable smartphone 520 to set up the communication session on smartphone 520. This may involve either retrieving the session information directly from the QR code or by going to a server with the session ID provided in the QR code. At step 504, smartphone 520 sets up the communication session and joins the session(s) by sending an add request or a join request or equivalent to the communication server 530, formatted in the appropriate protocol (e.g., H.323, SIP, etc.). Communication server 530 receives the request from smartphone 520 and bridges smartphone 520 to the communication session. If the communication session is to be cloned, then the communication session on PC 510 remains active after bridging smartphone 520 to the communication session.

When the communication session has been set up on smartphone 520, then smartphone 520 at step 505 sends an acknowledgement message to communication server 530 in order to confirm transfer of the communication session. In turn, then at step 506 the communication server 530 sends a message to PC 510 in order to confirm the session transfer. PC 510 receives the acknowledgement message at step 506 and stops displaying the QR code at step 507

In some circumstances it may be desirable to keep the communication session active on PC 510 even after it has been transferred to smartphone 520, for example if multiple persons are participating in the communication session using PC 510, but not all participants want to go mobile and participate by use of smartphone 520.

Embodiments in accordance with the present invention may facilitate multiple participants who wish to "go mobile" to take pictures of the same QR code, but will require the user to provide new credentials for the session on the mobile terminal, thus avoiding duplicate use of credentials.

Embodiments in accordance with the present invention may use an information-bearing visual display such as QR codes, or other short-range communication technologies such as NFC, to transfer communication session information from one smartphone to another smartphone without pre-registration, such as when transferring from one customer service agent to another customer service agent in a contact center. The use of such communication technologies and methods allows a customer service agent's device that is not pre-registered with the system to learn the communication session information from another agent's device.

Embodiments in accordance with the present invention may facilitate cloning of communication sessions using QR codes or other information-bearing visual displays, such that the original communication session is maintained and a copy of the communication session is taken and instantiated on a new endpoint. This allows for situations in which a group of people are logged into a communication session from one location and one of them needs to leave and take a copy of the communication session on his/her mobile phone.

Embodiments in accordance with the present invention facilitate policy-driven transfer, cloning and splitting of communication sessions, or of components of the communication sessions. Components may include, e.g., the separate audio and video data streams. The moderator of the communication session may set policy by specifying how the communication sessions are allowed to be transferred, cloned or split. Several types of policies can be set, including: (a) a limit on a number of times a communication session can be cloned or transferred; (b) a limit on a type of device and the location of devices to which the communication session can be cloned or transferred to; (c) control of user-specific transfer policies, which may result in, for example, one user not being allowed to clone or transfer a communication session whereas another user may have full rights to transfer a communication session; (d) device-specific clone and/or transfer policies; (e) modality of communication session transfer/clone on a user-specific basis, e.g. one user may not be allowed to instantiate video communication and may instantiate only audio communication.

In a contact center environment, an example of communication session cloning/transfer may arise when an agent and a supervisor are working on a customer issue at the agent's console or other communication device. The supervisor may like to take over the communication session for further resolution. The agent may click a "transfer session" button, which brings up an information-bearing visual display (e.g., QR code, barcode, etc.) on the agent desktop, the visual display containing the communication session information. The supervisor may then use his/her smartphone to capture the information from the information-bearing visual display and start the communication session (or a part of the session) on his/her own device. The communication session will be closed on the agent's console. The supervisor may then walk to her desk and dock the communication session on his/her console or other communication device, using methods described more fully elsewhere herein. Similarly, if the supervisor wants to keep the agent in the loop, he/she may instead clone the communication session from the agent rather than performing a transfer. In this scenario, embodiments in accordance with the present invention are able to use the readily available technology in smartphones (e.g., cameras, scanner software, etc.), coupled with a novel use of information-bearing visual display, in order to effect a communication session transfer between contact center agents, without a need for a prior association between the terminals involved.

In other embodiments in accordance with the present invention, if the communication system does not allow sharing of QR codes or other information-bearing visual displays, the communication system will generate a code that is unique per user. Such an information-bearing visual display would not be shareable. Alternatively, another method may be provided such that a mobile user may provide and/or receive session credentials if the QR codes are not shareable.

Figure 6:
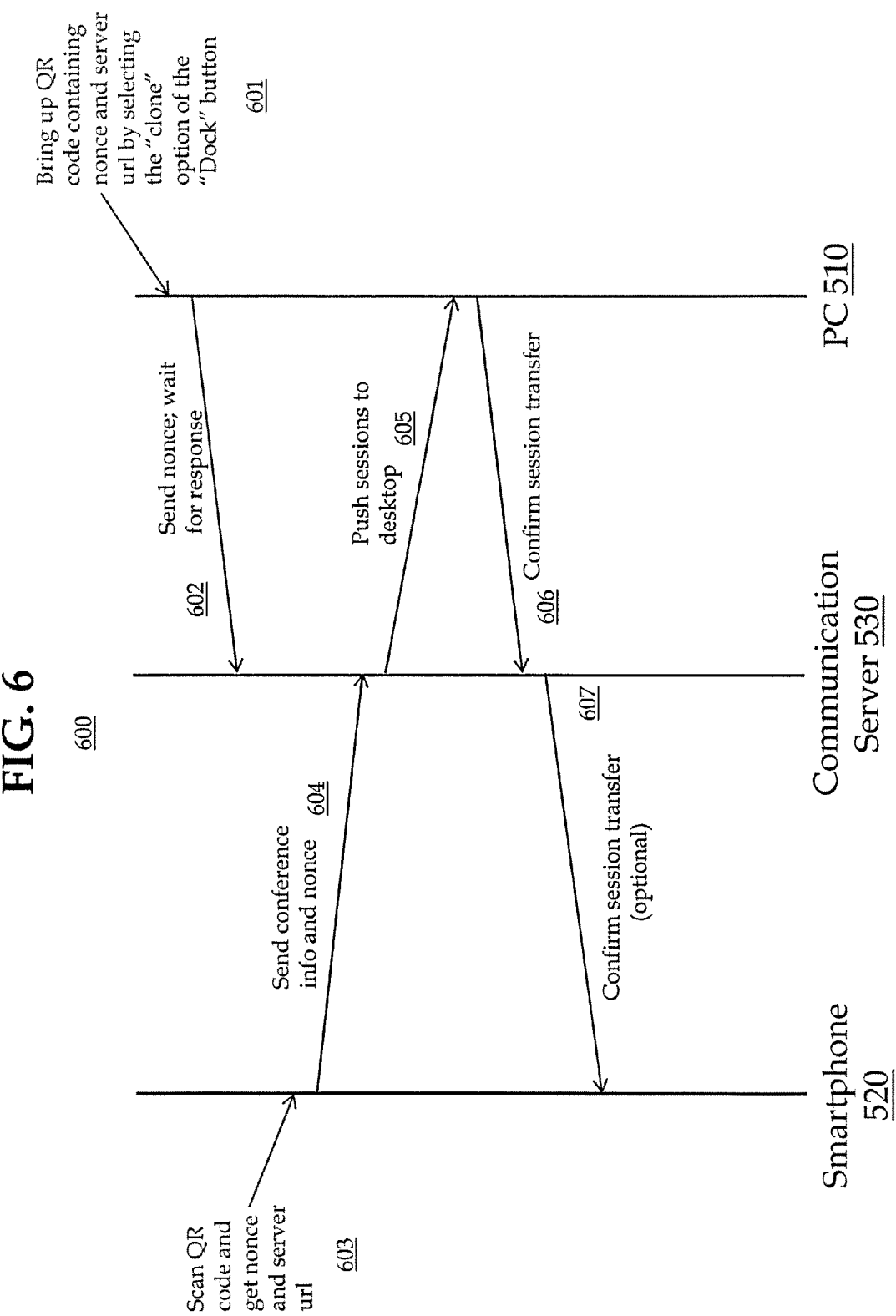
FIG. 6 illustrates a method and messages associated with cloning a communication session from a mobile device to a PC, in accordance with an embodiment of the present invention.

FIG. 6 illustrates a method 600 and messages associated with cloning a communication session from a mobile device to a desktop PC in accordance with an embodiment of the present invention. Message transfers for session setup, maintenance, and tear down may be conducted according to a protocol that provides audio-visual communication sessions on a packet network, such as SIP or H.323.

Method 600 begins when a user participating in a communication session by use of a smartphone desires to dock (i.e., to transfer) the communication session from the smartphone to PC 510. The user at step 601 will then command the desktop PC 510 to initiate the transfer, for instance by activating the "Transfer" or "Clone" option of a "Dock" command (i.e., a link, hotkey, etc.) in order to create and display a QR code or other visual transfer medium containing information to sufficiently identify PC 510, such as a nonce and server URL set-up information. A nonce may include a "contextually unique ID." For instance, the nonce may be a globally unique identifier ("GUID"), a random number, or a substantially unique number within the context of the application. The nonce generated by the PC is used as a session transfer identifier between all legs of the communication. Substantially at the same time, PC 510 may send message 602 to communication server 530 in order to send the nonce, and then PC 510 waits for a response from communication server 530.

At step 603, a user may manipulate smartphone 520 (or other sufficiently enabled mobile device) in order to take a picture, scan, or otherwise recognize the QR code displayed on PC 510. The QR code contains sufficient setup information (e.g., nonce, server URL, etc.) in order to transfer the communication session from smartphone 520 to PC 510. At step 604, smartphone 520 sends the sufficient setup information to communication server 530 so communication server 530 can add PC 510 to the saved or ongoing communication session that smartphone 520 is participating in.

At step 605, communication server 530 pushes the communication session to PC 510. Pushing sessions to PC 510 involves communicating to PC 510 the session information that is received from smartphone 520. PC 510 will use this session information to setup all the relevant sessions. PC 510 accepts the transfer, and at step 606 sends a confirmation of the session transfer to communication server 530. In turn, communication server 530 at step 607 sends a confirmation of the session transfer to smartphone 520.

At any step during the process, if the network, server 530, or the smartphone 520 do not respond, the waiting PC 510 and/or smartphone 520 goes into a timeout condition. For example, PC 510 displaying the QR code may timeout waiting for Step 605 and stop displaying the QR code. Similarly, smartphone 520 may timeout at step 608 waiting for message to close the session and initiate a recovery action, e.g., querying the user to shut down the conference.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the present invention to the precise form disclosed. Modifications and variations are possible in light of the above teachings or may be acquired from practice of the present invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method to clone a communication session from a first device to a second device, comprising:
    receiving, at the first device, a request to identify the communication session;
    rendering, by the first device, an information message comprising an identification of the communication session, wherein the first device accesses components of the communication session to generate the information message according to a configurable control policy and the information message is configured to be transmitted from the first device;
    acquiring, by the second device, the information message to clone the communication session from the first device onto the second device;
    bridging the second device to the communication session without dropping the first device from the communication session, to produce a cloned communication session based on the configurable controlled policy; and
    sending a confirmation message,
    wherein no prior association between the first device and the second device is used during the cloning.

2. The method of claim 1, wherein the information message from the first device is configured to be transmitted by way of a line-of-sight optical channel.

3. The method of claim 1, wherein the information message comprises a QR code.

4. The method of claim 1, further comprising providing an indicator to the communication session when the communication session has been cloned to the second device.

5. The method of claim 1, wherein bridging the second device is performed by a communication server.

6. The method of claim 1, wherein bridging the second device is performed by the first device.

7. The method of claim 1, wherein the step of rendering an information message further comprises the step of modifying components of communication session according to a configurable control policy.

8. A method to clone a communication session between a first device and a second device, from the second device onto a nonparticipating third device, comprising:
    receiving, by the nonparticipating third device, via a first communication channel an information message comprising an identification of the communication session from the second device, wherein the second device generates the information message by accessing components of the communication session according to a configurable control policy;
    sending, by the nonparticipating third device, via a second communication channel a request to clone the communication session onto the nonparticipating third device based on the configurable control policy; and
    receiving a confirmation that the communication session has been pushed to the nonparticipating third device,
    wherein no prior association between the second device and the third device is used during the cloning.

9. The method of claim 8, wherein the first communication channel comprises a line-of-sight optical channel from a visual display of the information message to an image sensor.

10. The method of claim 8, wherein information message comprises a QR code.

11. The method of claim 8, further comprising providing an indicator to the communication session when the communication session has been transferred from the mobile device.

12. The method of claim 8, wherein the first communication channel comprises a wireless channel configured to operate between a transmitter of the information message and a receiver of the information message.

13. The method of claim 8, wherein the second communication channel comprises a communication channel to a communication server.

14. The method of claim 8, wherein the second communication channel comprises a peer-to-peer communication channel.

* * * * *